(12) United States Patent
Garcia et al.

(10) Patent No.: US 8,135,033 B2
(45) Date of Patent: Mar. 13, 2012

(54) METHOD OF COMMUNICATING BETWEEN LAYERS OF A PROTOCOL STACK AND APPARATUS THEREFOR

(75) Inventors: Francisco Javier Garcia, Fife (GB); Robert Gardner, Glasgow (GB)

(73) Assignee: Agient Technologies, Inc., Santa Clara, CA (US)

( * ) Notice: Subject to any disclaimer, the term of this patent is extended or adjusted under 35 U.S.C. 154(b) by 965 days.

(21) Appl. No.: 11/400,324

(22) Filed: Apr. 7, 2006

(65) Prior Publication Data

US 2006/0277315 A1 Dec. 7, 2006

(30) Foreign Application Priority Data

Jun. 1, 2005 (GB) .................................. 0511112.5

(51) Int. Cl.
- *H04J 3/16* (2006.01)
- *H04J 3/24* (2006.01)
- *H04J 3/00* (2006.01)

(52) U.S. Cl. .................. 370/469; 370/474; 370/529
(58) Field of Classification Search .............. 370/351, 370/389, 464, 465, 466, 467, 469, 474, 522, 370/528, 529; 707/100

See application file for complete search history.

(56) References Cited

U.S. PATENT DOCUMENTS

| 5,951,647 | A | 9/1999 | Beah et al. |
| 7,242,695 | B2* | 7/2007 | Sprague et al. ............... 370/467 |
| 2002/0143986 | A1 | 10/2002 | Hale et al. |
| 2003/0074360 | A1* | 4/2003 | Chen et al. .................... 707/100 |
| 2003/0156582 | A1* | 8/2003 | Belgaied et al. .............. 370/389 |
| 2003/0231625 | A1* | 12/2003 | Calvignac et al. ............ 370/389 |
| 2004/0022192 | A1 | 2/2004 | Khan |
| 2004/0073724 | A1 | 4/2004 | Wilson et al. |
| 2004/0090988 | A1* | 5/2004 | Masputra et al. ............. 370/469 |
| 2004/0249903 | A1* | 12/2004 | Ha et al. ........................ 709/208 |
| 2005/0089032 | A1* | 4/2005 | Shankar ........................ 370/389 |

OTHER PUBLICATIONS

Campbell, Andrew, et al., Integrated Quality of Service for Multimedia Communications, Department of Computing, Lancaster University, Lancaster, UK, 1993, pp. 732-739.
GB Search Report dated Sep. 15, 2005.

* cited by examiner

*Primary Examiner* — Ricky Ngo
*Assistant Examiner* — Paul Masur

(57) ABSTRACT

In a method of communicating between layers of a protocol stack, message data are generated for communicating between a first layer and a second layer of the protocol stack. The message data are incorporated into a data unit by providing an opaque object within the data unit, conforming to a data structure definition supporting extendible schemas, the opaque object including the message data.

7 Claims, 6 Drawing Sheets

METHOD OF COMMUNICATING BETWEEN LAYERS OF A PROTOCOL STACK AND APPARATUS THEREFOR

The present invention relates to a method of communicating between layers of a protocol stack of the type, for example, used to communicate signalling and/or control data between layers of the protocol stack. The present invention also relates to an apparatus for communicating between layers of a protocol stack.

BACKGROUND ART

In the field of data communications, the Open Systems Interconnection (OSI) Reference Model, also known as the OSI seven-layer model, defines a conceptual framework for communications protocol design. The OSI Reference Model breaks down the communications task into seven, ostensibly independent, layers of peer-to-peer functionality. The ISO-OSI 7 layer Reference Model is more formally known as ISO Standard 7498, 1984, 7498-1:1994, and CCITT standard X.200.

Each layer of the OSI model only uses the functions of a layer directly below it, and only exports functionality to a layer directly above it. This abstract, independent-layered, approach simplifies design, analysis and implementation of complex communications protocols and associated system interactions, facilitating standardisation and thus vendor inter-operability.

A system implementing protocol behaviour conforming to a series of these layers is known as a protocol stack. Protocol stacks can be implemented either in hardware, firmware, software, or a combination of two or more of these. Typically, lower layers of the OSI model, which are closely associated with the low-level, high-speed, physical operation of a communications network are implemented in hardware, the higher layers being implemented in software.

However, in some circumstances, it is desirable to by-pass the strict functional layered-approach of the OSI Reference Model. In this respect, so-called "cross-layer" communication mechanisms, i.e. inter-layer signalling mechanisms, have been proposed to, for example, provide improved media access control, superior resource reservation control, and more efficient service dependent data transfer through different types of networks than is presently enjoyed. Efficient Transmission Control Protocol (TCP) over wireless media or fast-handover functionality in wireless networks are examples of useful applications of such cross-layer communications mechanisms. Examples of cross-layer communication mechanisms are described in "A Suggested QoS Architecture for Multimedia Communications" (A. Campbell, G. Coulson, F. Garcia, D. Hutchison, H. Leopold, N. Singer, ISO/IEC JTC1/SC21A/WGI N1201, 15-9-92, BSI/IST 21/-/1/51738, BSI/IST/21/-/5/62, 15p. (OSI95/LANC/A*/01/TR/P/V1, September 1992, MPG-92-37)), and "Integrated Quality of Service for Multimedia Communications" (A. Campbell, G. Coulson, F. Garcia, D. Hutchison and H. Leopold, IEEE INFOCOM 93, San Francisco, March 1993).

However, the known existing cross-layer communication mechanisms require a separate tangible communications channel between layers of the OSI model in order to communicate signalling and control data between the layers of the OSI model. Additionally, no standard, widely accepted, interfaces for inter-layer signalling and control data communications exist. Further, communication of inter-layer signalling and control data between hardware and software layers cannot readily be implemented. Also, known mechanisms lack synchronization of state (of a given layer) across layers, the state information relating to a given functionality at one layer may help in making better-informed decisions at another, upper, layer when performing similar or related functionality. For example, the Data Link layer protocol of a WiFi device performs functions to detect mobility, and attach a mobile device to a new cell when required while roaming. In this respect, layer 3 (the Network layer) at the IP level performs similar functions, but performance of these functions is dissociated with those of layer 2 (the Data Link layer).

DISCLOSURE OF INVENTION

According to a first aspect of the present invention, there is provided a method of communicating between layers of a protocol stack, the method comprising: generating message data for communicating between a first layer and a second layer of the protocol stack; incorporating the message data into a data unit by providing an opaque object within the data unit, the data unit conforming to a data structure definition supporting extendible schemas; wherein the opaque object comprises the message data.

The method may further comprise inserting the data unit into the first layer of the protocol stack.

The data unit may be a protocol data unit. The protocol data unit may be an Internet Protocol (IP) packet. The IP packet may be an IPv6 packet.

The opaque object may be an extendible header.

The method may further comprise forming the data unit in accordance with the data structure definition expressly for an inter-layer communication of the message data.

According to a second aspect of the present invention, there is provided a method of supporting a virtual channel for communicating data between layers of a protocol stack, the method comprising the method of communicating between layers of a protocol stack as set forth above in relation to the first aspect of the invention.

According to a third aspect of the present invention, there is provided a method of communicating between layers of a protocol stack, the method comprising: receiving a data unit formed in accordance with a data structure definition supporting an extendible schema; identifying an opaque object in the data unit relating to an inter-layer communication; and extracting data from the opaque object.

According to a fourth aspect of the present invention, there is provided an apparatus for communicating between layers of a protocol stack, the apparatus comprising: a processing resource arranged to generate message data for communication between layers of the protocol stack; wherein the processing resource is arranged to incorporate the message data into a data unit by providing an opaque object within the data unit, the data unit conforming to a data structure definition supporting an extendible schema; and the opaque object comprises the message data.

According to a fifth aspect of the present invention, there is provided a virtual channel to support communication of data between layers of a protocol stack, the virtual channel being supported by opaque objects within data units conforming to a data structure definition, the data structure definition supporting extendible schemas.

According to a sixth aspect of the present invention, there is provided a use of an extendible schema supported by a data structure definition for data units to serve as a medium for communicating data constituting content of an inter-layer communication between layers of a protocol stack.

It is thus possible to provide a method of communicating between layers of a protocol stack and an apparatus for implementing the same, thereby permitting interaction between different layers of the protocol stack for signalling and/or control purposes, the protocol stack itself being used for transfer of signalling and/or control data. Consequently, state synchronization across both two or more layers is possible.

BRIEF DESCRIPTION OF DRAWINGS

At least one embodiment of the invention will now be described, by way of example only, with reference to the accompanying drawings, in which.

DETAILED DESCRIPTION

Figure 1:
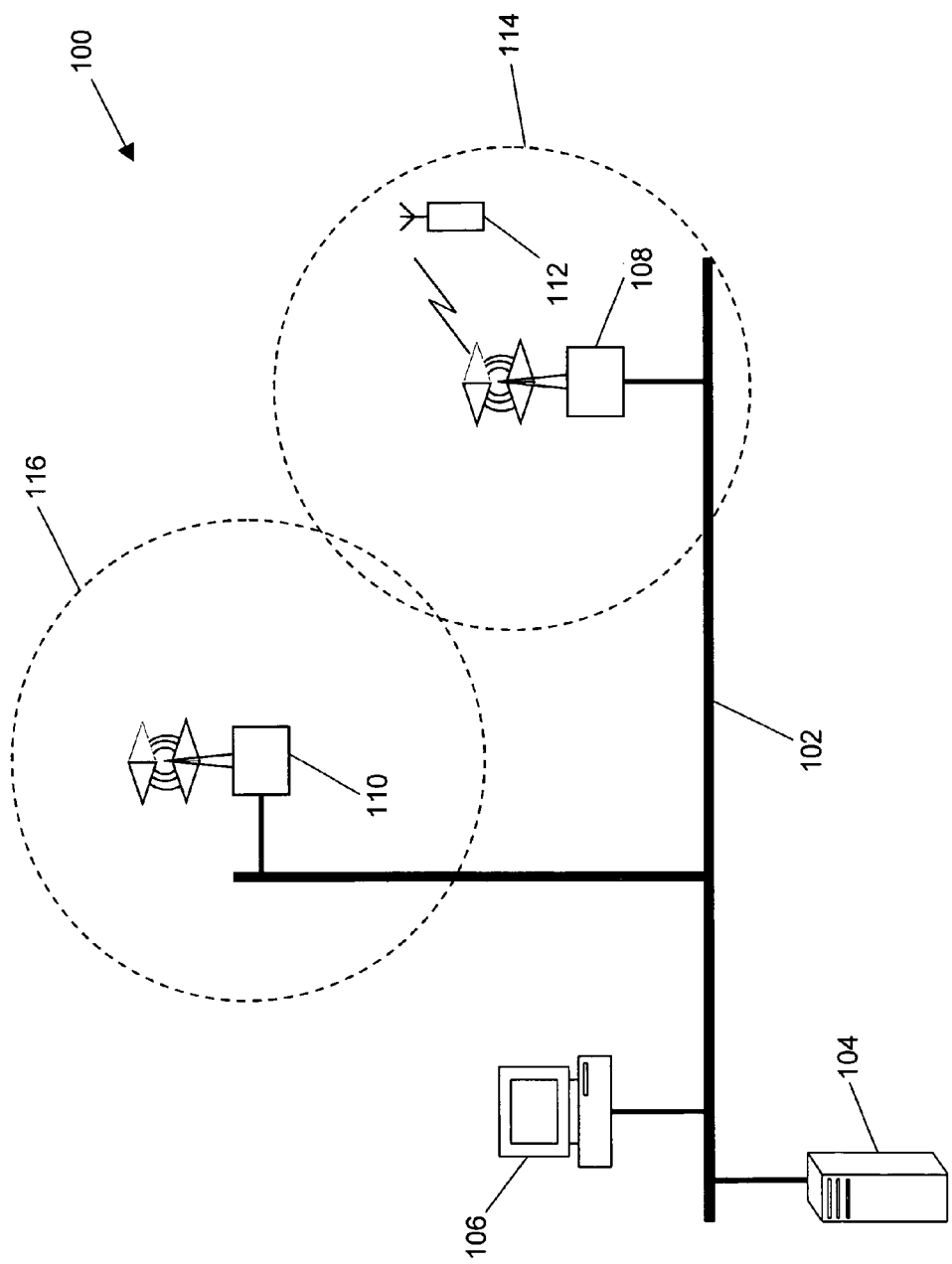
FIG. 1 is a schematic diagram of a communications network comprising an apparatus constituting an embodiment of the invention.

Throughout the following description identical reference numerals will be used to identify like parts.

Referring to FIG. 1, a communications network 100, for example a Local Area Network (LAN) has a backbone 102 supported by switching hardware and software (not shown), the backbone 102 being coupled to a server 104, a client terminal 106, a first wireless Access Point (AP) 108 and a second wireless AP 110.

The first wireless AP 108 supports wireless LAN communications between a wireless terminal 112, for example a mobile computing device, such as a laptop computer with wireless LAN capabilities, a Personal Digital Assistant (PDA) with wireless LAN capabilities, or a cellular telephone handset capable of wireless LAN communication. The second wireless AP 110 also supports wireless LAN communications between the second wireless AP 108 and wireless devices having compatible wireless communications capabilities. A first cell 114 is supported by the first AP 108 and a second cell 116 is supported by the second AP 110.

In this example, the wireless LAN communications is supported in accordance with the Institute of Electronic and Electrical Engineers (IEEE) standard IEEE 802.11a, 802.11b, or 802.11g. However, the skilled person will appreciate that other suitable wireless communications standards exist and can be used.

Figure 2:
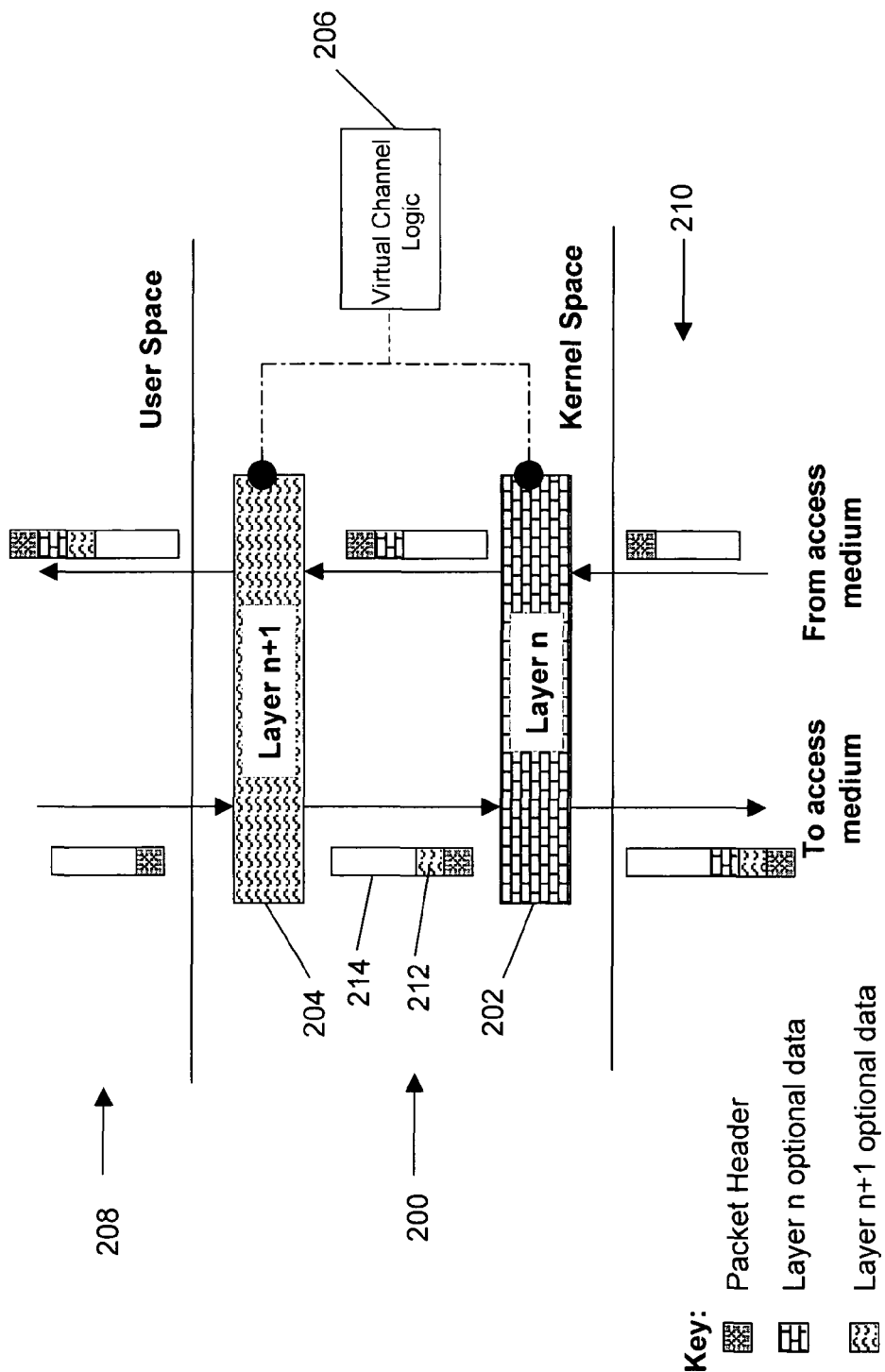
FIG. 2 is a schematic diagram of, inter alia, a kernel space supported by a processing resource of a wireless access point of FIG. 1.

Turning to FIG. 2, the first AP 108 will now be described in relation to the salient parts of the AP 108 for the sake of clarity and conciseness of description. However, the skilled person will appreciate that other functional elements of the AP 108 exist, but are not described since they are not directly relevant to the operation of this embodiment of the invention. It should also be appreciated that the second AP 110 has the same structure as the first AP 108 and so the structure of the second AP 110 will not be described herein to avoid repetition.

Although not shown, the first AP 108 has a processing resource, for example one or more microprocessors, and volatile memory, such as Random Access Memory (RAM) and non-volatile memory, such as Read Only Memory (ROM). A part of the processing resource, and the volatile memory is reserved to serve as a kernel space 200 for executing software code to implement functionality associated with the seven layers of the OSI Reference Model. In this respect, FIG. 2 shows two adjacent layers, in this example, a Data Link layer 202 and a Network layer 204; a virtual channel logic 206 is interfaced with the Data Link layer 202 and the Network layer 204. Additional resources of the processing resource is reserved for a user space 208 for the execution of user applications, for example a firewall, the user space 208 being capable of communicating with the kernel space 200. In order to communicate data via the backbone 102, the kernel space is, of course, coupled to an access medium 210, for example a wireless LAN as already described above. In this example, a Linux operating system environment is used with a dynamically loadable kernel module, namely the virtual channel logic 206, that interfaces with respective points in the kernel protocol stack as described above via appropriately located kernel "hooks" that are pre-compiled into the kernel protocol stack. Alternatively, the modifications and extensions can be achieved by applying a patch to source code of the kernel protocol stack and then recompiling the kernel. However, whilst Unix-based kernels can be employed, it is possible to use dynamically linkable libraries, available for other kernels such as various versions of Microsoft® Windows™, to achieve the same functionality as described herein.

Figure 3:
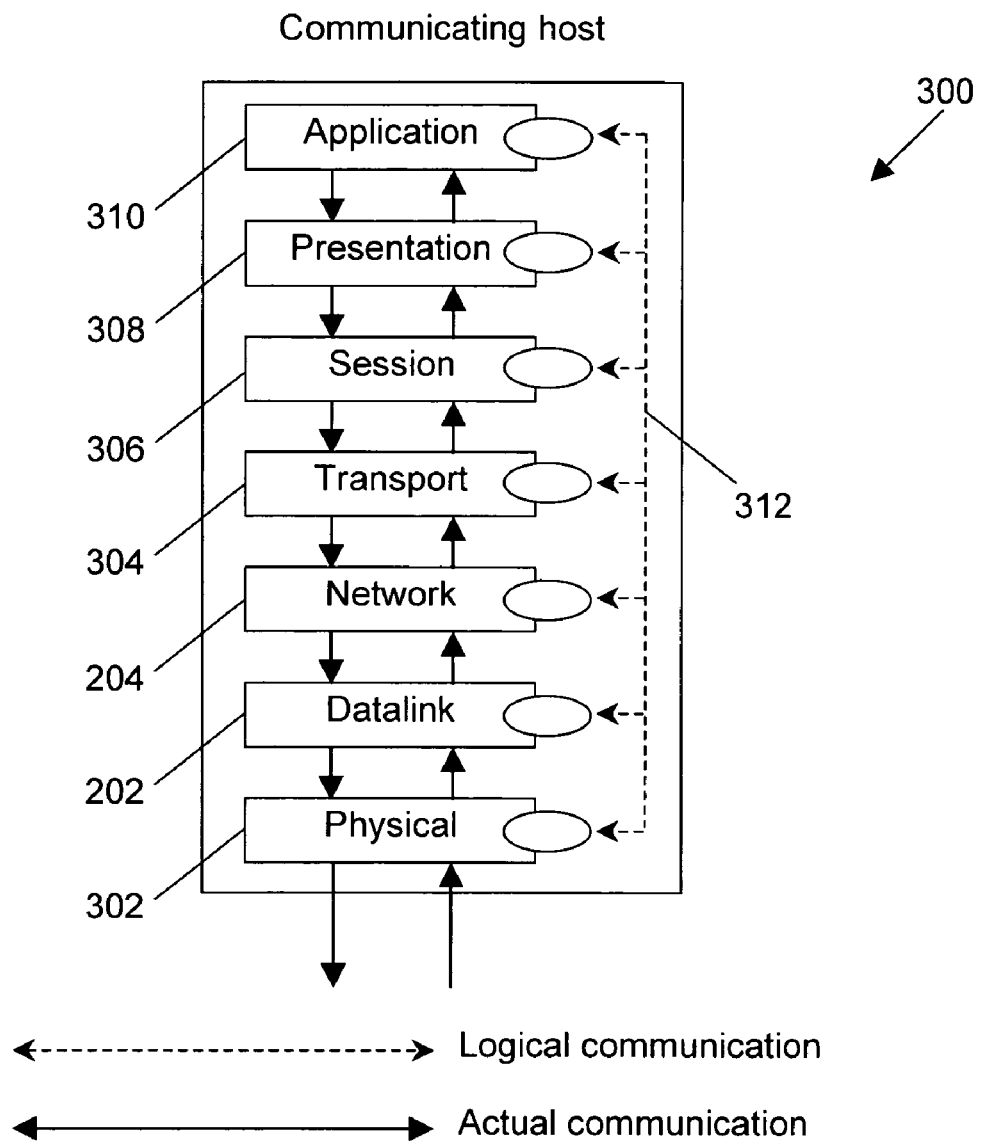
FIG. 3 is a schematic diagram of a protocol stack implemented by the kernel space of FIG. 2.

Referring to FIG. 3, as mentioned above, the kernel space 200 of the first and second APs 108, 110 supports a protocol stack 300 for communications between communicating devices, such as the server 104 and the wireless terminal 112 via the first or second AP 108, 110. In this example, the protocol stack 300 comprises seven layers: a Physical layer 302, the Data Link layer 202, a Network layer 204, a Transport layer 304, a Session layer 306, a Presentation layer 308 and an Application layer 310. However, for some applications it is known to exclude one or more layers where an application permits and it is beneficial to do so.

A virtual channel 312, supported by the virtual channel logic 206 is capable of supporting communications between any of the seven layers of the protocol stack 300. The virtual channel being provided by the virtual channel logic 206 makes use of extendible schemas in accordance with the data structure definition being used, for example IPv6. In this example, the extendible schema being employed is extension headers.

Figure 4:
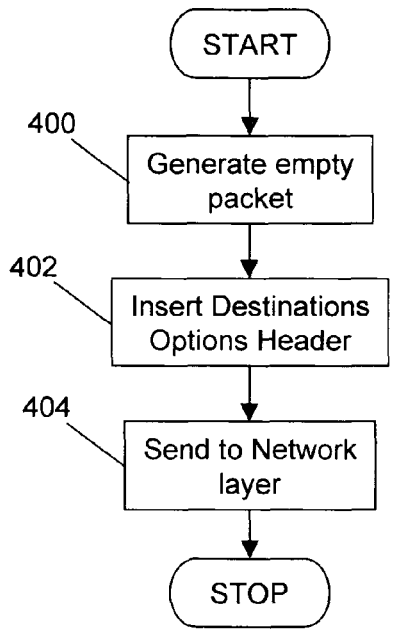
FIG. 4 is a flow diagram of a first part of a method of communicating between layers of the protocol stack of FIG. 3 in accordance with a second embodiment of the invention.

In operation (FIG. 4), the wireless terminal 112 is initially located within the first cell 114 and in communication with the first AP 108 in order to communicate packets of data with the server 104. In this example, the packets of data are formed in accordance with the Internet Protocol (IP) v6. Although initially stationary, the wireless terminal 112 begins to move towards the second cell 116, thereby moving to an edge of the first cell 114. Eventually, the wireless terminal 112 moves into the second cell 116 and so leaves the first cell 114. During the transition from the first cell 114 to the second cell 116, the wireless terminal 112 needs to execute a handover from the first AP 108 to the second AP 110.

For handover to be executed, signalling firstly has to take place between the wireless terminal 112 and the first and second APs 108, 110 in order to implement a first mobility management transaction at the Data Link layer 202 for dealing with known considerations in relation to the Data Link layer 202, such as switching Radio Frequency (RF) communications with the wireless terminal 112 from the first AP 108 to the second AP 110. The first mobility management transaction is implemented in accordance with one of the IEEE 802.11a,b, or g standard. However, before the handover can be completed, a separate and independent mobility management transaction is implemented at the Network layer 204 in order to execute a handover at the Network layer 204 so as to address certain known considerations in relation to the Network layer 204, for example, routing. Additionally, the first protocol is known to complete all necessary processing in relation to the handover before the separate protocol implemented at the Network layer 204.

Consequently, in order to improve pan-layer reaction time in relation to handovers so as to minimise delays and/or data loss observable by users, the virtual channel is used to communicate the fact that a handover between cells in relation to the wireless terminal 112 has taken place at the Data Link layer 202, the communication being sent from the Data Link layer 202 to the Network layer 204. The communication of the change of cell is an example of communication of signalling, control data and state information.

A message from the Data Link layer 202 to the Network layer 204, or between any other layers, can be achieved in a number of ways, three of which are described herein in relation to the Data Link and Network layers 202, 204.

In a first embodiment, the virtual channel logic 206 generates a dummy IPv6 packet (400) in response to detection by the virtual channel logic 206 of execution of the mobility management transaction at the Data Link layer 202. In order for the Network layer 204 to readily recognise the communication of data relating to mobility management, the dummy IPv6 packet is a recognised state transition message for mobility management at the Network Layer 204, for example a IPv6 router advert message announcing a new network prefix. The virtual channel logic 206 then inserts (402) a Destination Options Header in the packet, resulting in the packet having a structure as exemplified in FIG. 6. The virtual channel logic 206 then inserts the newly created dummy packet into the protocol stack 300 at the Data Link layer 202. In accordance with the normal operation of the Data Link layer 202, the kernel space 200 progresses (404), by passing pointers, the dummy packet up the protocol stack 300, whereupon (FIG. 5), the dummy packet is effectively received (500) by the Network layer 204 of the protocol stack 300. In this respect, the skilled person will understand that the packet is usually stored in reserved buffer memory allocated to the kernel space 200 and accessed by program code specific to each layer of the protocol stack by the passage of pointers between the layers of the protocol stack.

Herein, the Destination Options Header, as described in Request For Comments (RFC) 2460 (www.faqs.org), is the extension header used to carry message content to be conveyed from one layer of the protocol stack 300 to another layer of the protocol stack 300; in this example a message is being passed from the Data Link layer 202 to the Network layer 204. The Destination Options Header is encoded as a type-length-value (TLV) tuple, that need only be processed by a destination layer of the protocol stack 300 programmed to detect and potentially act upon one or more predetermined option types. As is known from RFC 2460, the Type identifies the type of Option, the Length indicates the length of an option data field in octets, whilst the Value represents the option specific data, in this example the message content. In this respect, the message content is for the purpose of communicating the detection of the movement of the wireless terminal 212 in the second cell 116. Consequently, the message contains signal strength data and/or a so-called "ESSID" cell identifier.

Upon receipt (500) by the Network layer 204 of the dummy packet containing the signalling data, the Network layer 204 establishes (502) whether or not the message contains option types of interest to the Network layer 204. If the option type borne by the dummy packet is not recognised as being of interest to the Network layer 204, the Destination Option is ignored (504) by the Network layer 204 and pointers are passed to a layer above the Network layer 204, i.e. the Transport layer 304 in this example. Alternatively, if the option type borne by the dummy packet is of interest to the Network layer 204, the Network layer 204 extracts (504) the message from the Destination Option within the Destination Options Header of the dummy packet, to obtain the signal strength data and/or the cell identifier. The Network layer 204 then either makes immediate or near-immediate use of the extracted data, or awaits further data from the Data Link layer 202 to confirm that the wireless terminal 212 has moved into the second cell 116. Once the Network layer 204 is satisfied that the data obtained from the Data Link layer 202 is reliable, the Network layer 204 executes a handover in accordance with the separate protocol required at the Network layer 204.

Figure 5:
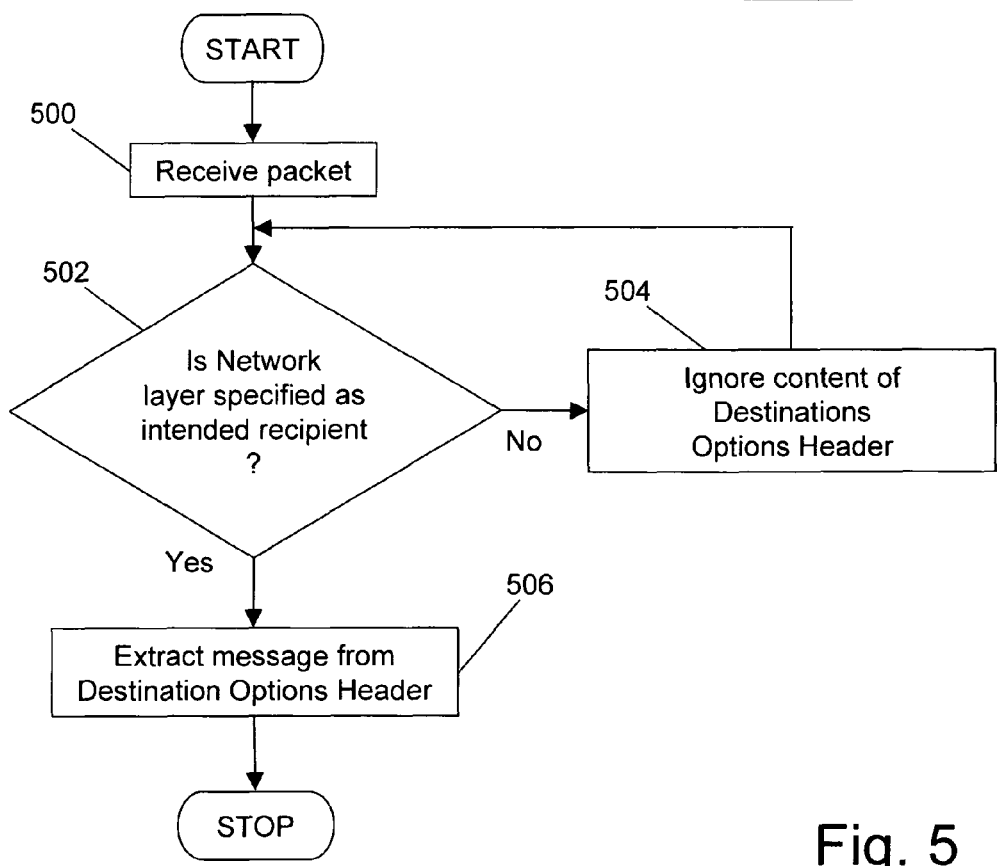
FIG. 5 is a flow diagram of a second part of the method of communicating between the layers of the protocol stack of FIG. 3.
Figure 6:
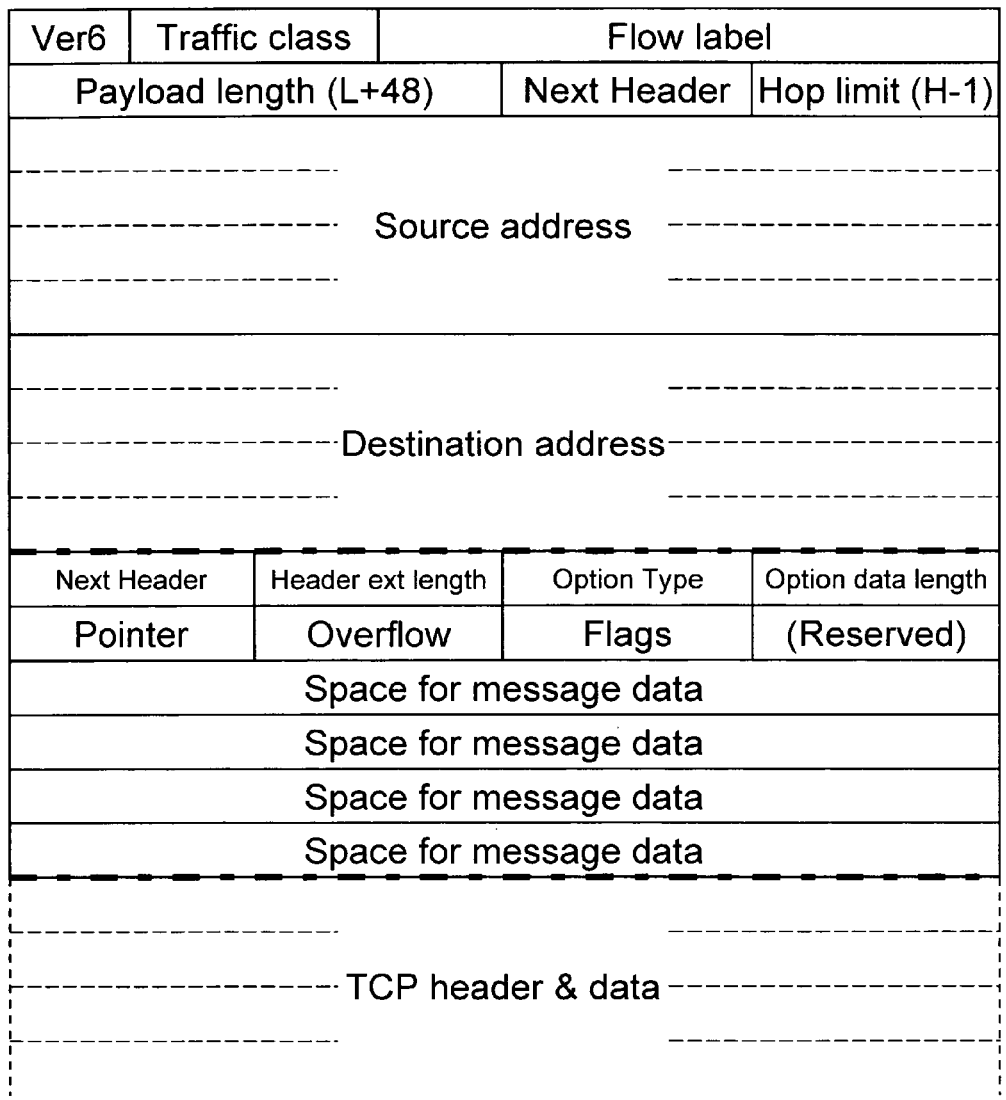
FIG. 6 is a schematic diagram of an IPv6 packet used in the method of FIGS. 4 and 5.
Figure 7:
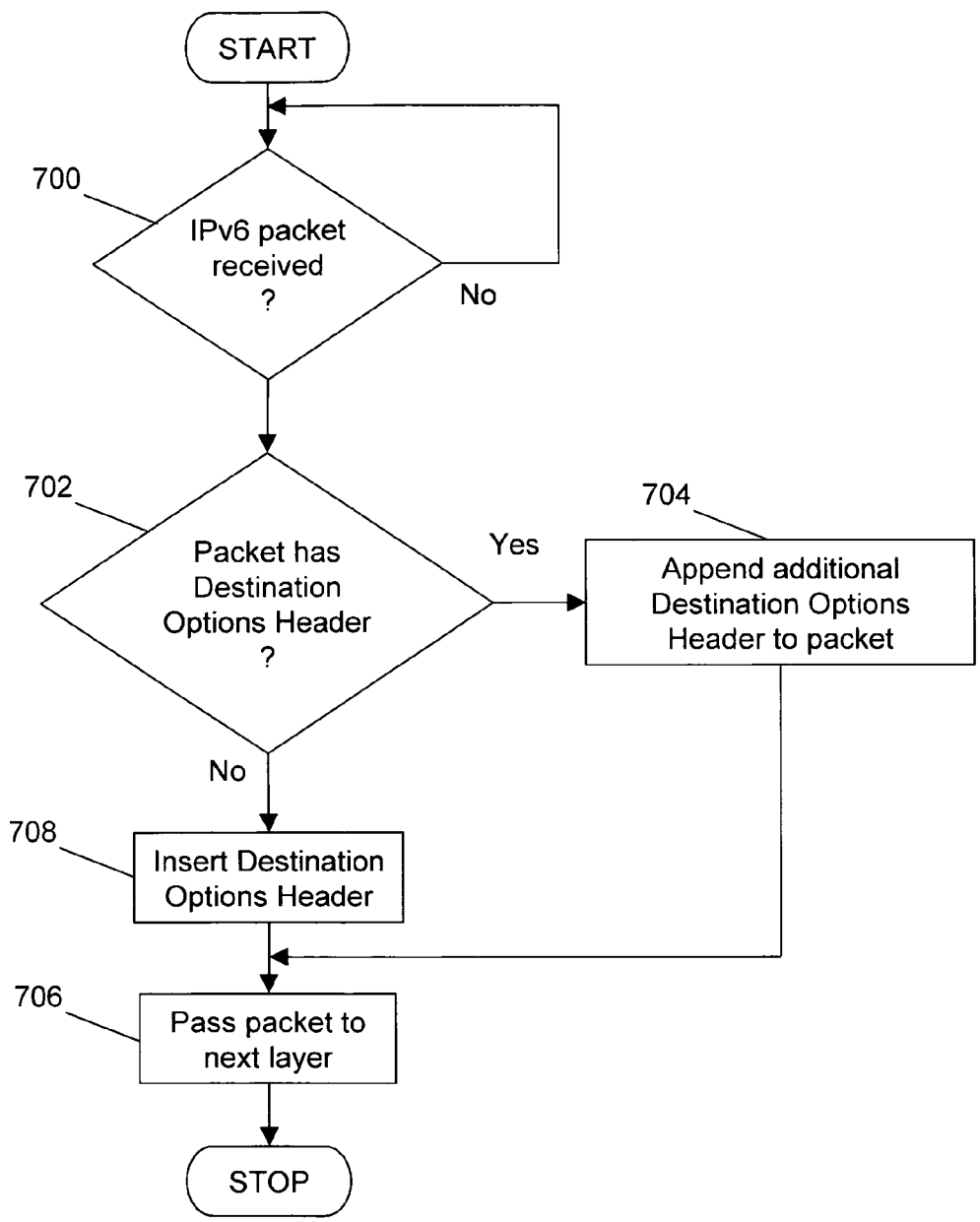
FIG. 7 is a flow diagram of an alternative first part of the method of communicating between the layers of the protocol stack of FIG. 3 in accordance with a third embodiment of the invention.

In another embodiment (FIG. 7), messages carried in the Destination Options Header of packets are extracted in the same way as descried above in relation to FIG. 5. However, instead of generating a dedicated dummy packet within which to transport the message from the Data Link layer 202 to the Network layer 204, packets received by the first and/or second AP 108, 110 are modified in the following way.

A packet received by the Data Link layer 202 as part of non-synthetic traffic by the first and/or second AP 108, 110 is examined by virtual channel logic 206 in order to determine (700) whether or not the packet received has been formed in accordance with the IPv6 protocol. If the packet has been formed in accordance with the IPv6 protocol, the virtual channel logic 206 then determines (702) whether the received packet contains a Destination Options Header. If the received packet already contains one or more Destination Options, the virtual channel logic 206 modifies the length field of the Destination Options Header of the packet and appends (704) a new Destination Option, encoded as a TLV tuple, after a last Destination Option in the received packet. The new Destination Option contains data and a message of the type described above in relation to the previous embodiment.

The Data Link layer 202 then passes the received packet containing the new Destination Options Header to the Network layer 204 by means of pointer passing as already described above in relation to the previous embodiment.

In a further embodiment, if the received packet is deemed (702) not to contain any Destination Options Headers, the virtual channel logic 206 simply generates a first Destinations Options Header and inserts it into the received packet. Thereafter, the modified received packet is passed to the Network layer 204 in the manner already described above for subsequent receipt by the Network layer 706.

Of course, although not described above, the Network layer 204 is able to pass messages back to the Data Link layer 202 using the virtual channel using the same mechanism as described above. In this respect, referring to FIG. 6, an outbound packet 212 being passed from the Network layer 204 to the Data Link layer 202 can be used to carry a reply message 214 or any other necessary message not necessarily in reply to anything.

Whilst the above example has been described in the context of communication of data between layers of the protocol stack, the skilled person will appreciate that the virtual channel described herein can be used to communicate data between layers of the protocol stack in relation to different hosts. For example, in order to communicate or "tunnel" data, such as signal strength at a location of a mobile node, from the Mobile Node to a home agent in a network that supports node mobility, such as IPv6. In this respect, a Binding Update message and/or a Binding Acknowledgement message can be used as a vehicle to communicate the above mentioned data between the Mobile Node and the Home Agent. Indeed, the above described mechanism for providing a virtual channel between layers of a protocol stack can be used not only for the application described above, but any number of suitable applications requiring direct communication between layers of the protocol stack.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. A method of communicating between layers of a protocol stack, the method comprising:
   generating message data for communicating between a first layer and a second layer of the protocol stack, wherein the first layer is a lower layer than the second layer in the protocol stack;
   receiving a packet as part of non-synthetic traffic by the first layer;
   incorporating the message data into the received packet by appending a header recognizable by the second layer, the header comprising the message data and additional destination options, the packet conforming to a data structure definition supporting extendible schemas;
   receiving the packet at the second layer; and
   extracting the message data in response to recognizing the header.

2. A method as claimed in claim 1, wherein the packet is an Internet Protocol (IP) packet.

3. A method as claimed in claim 1, wherein the header is an extendible header.

4. A method as claimed in claim 1, further comprising:
   forming the data unit in accordance with the data structure definition expressly for an inter-layer communication of the message data.

5. A method of supporting a virtual channel for communicating data between layers of a protocol stack, the method comprising the method of communicating between layers of a protocol stack as claimed in claim 1.

6. A method of communicating between layers of a protocol stack, the method comprising:
   receiving at a second layer a packet of non-synthetic traffic formed in accordance with a data structure definition supporting an extendible schema;
   identifying in the packet a header appended by a first layer and recognizable by the second layer, wherein the first layer is a lower layer than the second layer in the protocol stack, the header comprising additional destination options and message data relating to an inter-layer communication; and
   extracting the message data in response to recognizing the header.

7. An apparatus for communicating between layers of a protocol stack, the apparatus comprising:
   a microprocessor and memory arranged to generate message data for communication between layers of the protocol stack;
   wherein the microprocessor and memory are arranged to receive a packet at a first layer of the protocol stack as part of non-synthetic traffic and to incorporate the message data into the received packet by appending a header recognizable by a destination layer, wherein the first layer is lower than the destination layer in the protocol stack, the header comprising the message data and additional destination options, the packet conforming to a data structure definition supporting an extendible schema.

* * * * *